(12) United States Patent
Seo et al.

(10) Patent No.: US 8,651,665 B2
(45) Date of Patent: Feb. 18, 2014

(54) PROJECTOR

(75) Inventors: Eunsung Seo, Seoul (KR); Seungman Jeong, Seoul (KR); Hyunho Choi, Seoul (KR); Sanghun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 328 days.

(21) Appl. No.: 13/021,015

(22) Filed: Feb. 4, 2011

(65) Prior Publication Data

US 2011/0194076 A1 Aug. 11, 2011

(30) Foreign Application Priority Data

Feb. 5, 2010 (KR) ......................... 10-2010-0011165

(51) Int. Cl.
*G03B 21/20* (2006.01)
(52) U.S. Cl.
USPC .............................. 353/20; 353/38; 353/102
(58) Field of Classification Search
USPC .................... 353/20, 33, 38, 69, 70, 81, 102; 359/443, 448, 455
See application file for complete search history.

(56) References Cited

U.S. PATENT DOCUMENTS

| 6,118,588 A * | 9/2000 | Yamamoto | 359/618 |
| 2003/0193650 A1 * | 10/2003 | Sugawara | 353/31 |
| 2005/0248732 A1 | 11/2005 | Tomita | |

FOREIGN PATENT DOCUMENTS

| JP | 04-166823 A | 6/1992 |
| JP | 2000-321527 A | 11/2000 |
| JP | 2002-258212 A | 9/2002 |
| JP | 2007-171443 A | 7/2007 |
| JP | 2008-015501 A | 1/2008 |
| JP | 2009-181146 A | 8/2009 |
| KR | 10-2005-0049480 A | 5/2005 |
| TW | 2004-13816 A | 8/2004 |
| TW | 2009-42955 A | 10/2009 |

OTHER PUBLICATIONS

Office Action dated Nov. 8, 2011 in Korean Application No. 10-2010-0011165, filed Feb. 5, 2010.

Office Action dated Jan. 8, 2013 in Japanese Application No. 2011-023009, filed Feb. 4, 2011.

Office Action dated Dec. 16, 2013 in Taiwanese Application No. 2004-883779.

* cited by examiner

*Primary Examiner* — Kevin Pyo
(74) *Attorney, Agent, or Firm* — Saliwanchik, Lloyd & Eisenschenk (57) ABSTRACT

Disclosed is a projector, the projector including a light source, an illumination unit illuminating light incident from the light source, and a display device enabling to realize an image by receiving the light irradiated from the illumination unit, and whose center is positioned at an axis different from an optical axis of the illumination unit.

16 Claims, 11 Drawing Sheets

PROJECTOR

CROSS-REFERENCE TO RELATED APPLICATION

This application claims the benefit under 35 U.S.C. §119 of Korean Patent Application No. 10-2010-0011165, filed Feb. 5, 2010, which is hereby incorporated by reference in its entirety.

BACKGROUND OF THE DISCLOSURE

1. Field of the Invention

Embodiments of the present disclosure may relate to a projector configured to broaden a degree of freedom relative to position selection of a display device.

2. Discussion of the Related Art

Lately, a projector, which magnifies and projects a small image to a large screen, attracts attention as a flat display enabling to realize a large-sized screen with a slim design instead of a cathode ray tube having a large volume and a limited screen size.

A device enabling to realize a high quality image on a large screen may include a liquid crystal display (hereinafter abbreviated LCD), a plasma display panel and a projection display system, to name a few.

Generally, an optical system of a project may be categorized into two types, that is, an illumination system, and a projection system. The illumination system is configured such that light emitted from a light source is equally illuminated to a small-sized imager via an FEL (Fly Eye Lens) or an integrator which is an optical tunnel, and the projection system is configured such that an illuminated light is incident on each panel via the illumination system, where an imager is enlarged to be captured on a screen.

BRIEF SUMMARY

Technical subjects to be solved by the present disclosure are not restricted to the above-mentioned description, and any other technical problems not mentioned so far will be clearly appreciated from the following description by the skilled in the art.

In one general aspect of the present disclosure, there is provided a projector, the projector comprising: a light source; an illumination unit illuminating light incident from the light source; and a display device enabling to realize an image by receiving the light irradiated from the illumination unit, and whose center is positioned at an axis different from an optical axis of the illumination unit.

In some exemplary embodiments of the present disclosure, the display device may be positioned at an upward direction of the optical axis of the illumination unit.

In some exemplary embodiments of the present disclosure, an offset of the display device may be positioned at 1~200%.

In some exemplary embodiments of the present disclosure, the display device may be a reflective display device or a transmissive display device.

In some exemplary embodiments of the present disclosure, the projector may further include a PBS (Polarizing Beam Splitter) that transmits the light from the illumination unit to the display device.

In some exemplary embodiments of the present disclosure, the illumination unit may include a collimation lens advancing in parallel the light emitted from the light source to a predetermined direction, an optical part equally emitting the light from the collimation lens to the display device, and at least one illumination lens that is tilted from the optical axis of the light source, the collimation lens and the optical part.

In some exemplary embodiments of the present disclosure, the projector may further include a PBS transmitting the light from the illumination unit to the display device, wherein the illumination lens may include first and second illumination lenses, where the first illumination lens is interposed between the optical part and the PBS, and the second illumination lens is interposed between the PBS and the display device.

In some exemplary embodiments of the present disclosure, the illumination unit may include an FEL (Fly Eye Lens), where the FEL may include micro lenses formed at an incidence surface for collecting the incident light on a light emitting surface, and micro lenses formed at a light emitting surface for advancing the collected light upwards from the optical axis.

In some exemplary embodiments of the present disclosure, the illumination unit may further include a collimation lens advancing in parallel to a predetermined direction the light emitted from the light source to the FEL, and the optical axis of the collimation lens and the light source is tilted from the optical axis of the FEL.

In some exemplary embodiments of the present disclosure, the illumination unit may further include a collimation lens advancing in parallel to a predetermined direction the light emitted from the light source to the FEL, and a center of the light source is upwardly positioned from the optical axis of the collimation lens.

In some exemplary embodiments of the present disclosure, the illumination unit may further include a collimation lens advancing in parallel to a predetermined direction the light emitted from the light source to the FEL, and the optical axis of the light source and the collimation lens and an optical axis of the FEL is identical.

In some exemplary embodiments of the present disclosure, the illumination unit may include collimation lenses advancing in parallel to a predetermined direction the light emitted from the light source, an FEL (Fly Eye Lens) equally emitting the light of the collimation lenses to the display device, and a prism upwardly eccentrically emitting the light through the FEL to illuminate the display device.

In some exemplary embodiments of the present disclosure, the prism may be one of a structure of refracting the incident light and the emitted light to upwardly illuminate the display device, a structure of refracting the emitted light to upwardly illuminate the display device, and a structure of refracting the incident light to upwardly illuminate the display device.

In some exemplary embodiments of the present disclosure, the prism may be a projector formed with two sides that are not perpendicular to the optical axis of the illuminating unit.

In some exemplary embodiments of the present disclosure, the illumination unit may include collimation lenses advancing in parallel to a predetermined direction the light emitted from the light source, an FEL (Fly Eye Lens) equally emitting the light of the collimation lenses to the display device, and first and second lenses each having an optical axis different from that of the FEL, and upwardly illuminating the light through the FEL to the display device.

In some exemplary embodiments of the present disclosure, the illumination unit may include an optical guide block receiving the light emitted from the light source to generate an optical shape that is same as that the display device, and illumination lenses formed with an optical axis deviated from that of optical guide block.

In some exemplary embodiments of the present disclosure, first and second condenser lenses condensing the light emitted from the light source to the optical guide block may be interposed between the light source and the optical guide block.

In another general aspect of the present disclosure, there is provided a projector, the projector comprising: collimation lenses advancing in parallel to a predetermined direction the light emitted from the light source, an FEL (Fly Eye Lens) equally emitting the light of the collimation lenses to the display device, a prism upwardly and eccentrically illuminating the light through the FEL, formed with a first side and a second side that are not perpendicular to the optical axis of the FEL, a third side and a fourth side that are connected to the first and second sides, where the third and fourth sides are connected to the first side at an acute angle, and the third side and the fourth side are connected to the second side at an obtuse angle; and a display device enabling to realize an image by receiving the light emitted from the prism, and whose center is positioned at an axis different from the optical axis of the illumination unit.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

Figure 1:
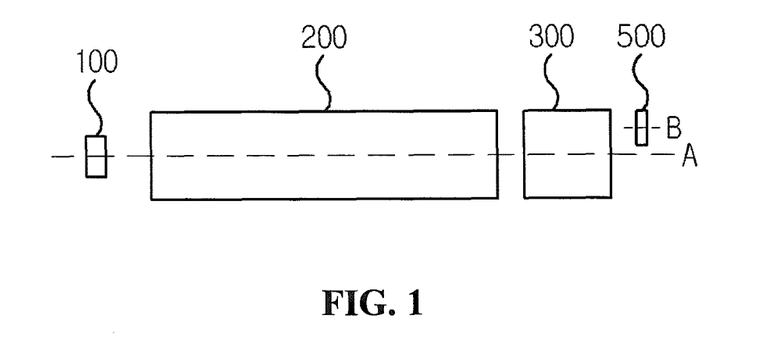
FIG. 1 is a schematic view of a projector according to the present disclosure.

FIG. 1 is a schematic view of a projector according to the present disclosure.

A projector according to the present disclosure may include a light source 100; an illumination unit 200 illuminating light incident from the light source 100; an optical element 300 transmitting the light from the illumination unit 200; and a display device 500 enabling to realize an image by receiving the light irradiated from the illumination unit 200, whose center (B) is positioned at an optical axis different from an optical axis (A) of the illumination unit 200.

The optical element 300 functions to transmit the light of the illumination unit 200 and to reflect the light reflected from the display device 500 to a transmission unit. Therefore, the optical element 300 may be defined as an element that separates light of the illumination unit and the transmission unit. For example, the optical element may be used as a polarizing Beam Splitter (PBS). Furthermore, the display device may be also used as, for example, a reflective digital micro-mirror device (DMD), a liquid crystal on silicon (LCOS) device, or transmissive thin film transistor (TFT) based devices.

The illumination unit 200 illuminates by upwardly illuminating the light emitted from the light source 100 to the display device 500, such that the center (B) of the display device 500 can be positioned at an optical axis different from that of the illumination unit 200, whereby there is no need of matching the optical axis of the display device with that of the illumination unit 200.

Therefore, the projector according to the present disclosure is configured in such a manner that an optical system can be advantageously designed with light upwardly illuminated to the display device, whereby the degree of freedom relative to position selection of display device can be broadened to position the display device at a place desired by a designer. Furthermore, the display device 500 is positioned at a place upward of the optical axis (A) of the illumination unit 200.

Figure 2:
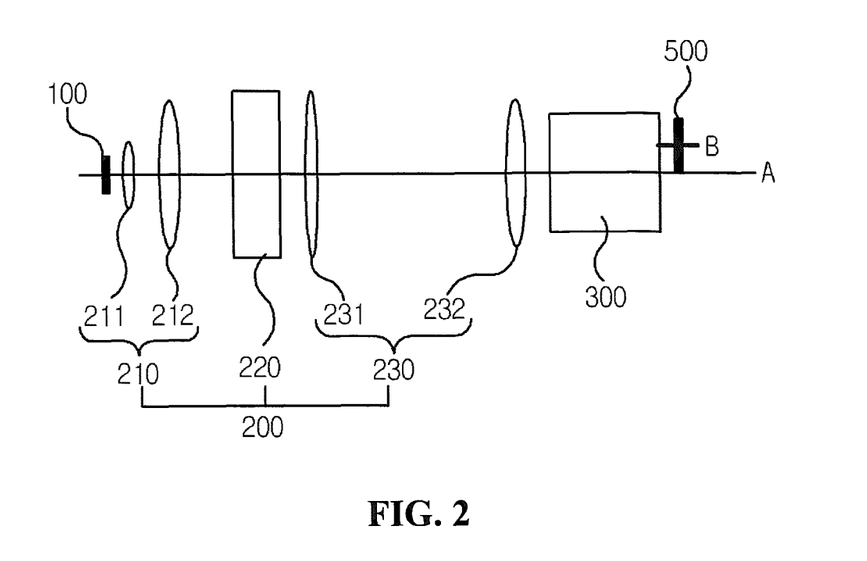
FIG. 2 is a schematic view illustrating an example of a projector according to the present disclosure.

FIG. 2 is a schematic view illustrating an example of a projector according to the present disclosure.

The illumination unit 200 can illuminate by illuminating light to an area upward from an optical axis of the illumination unit 200 to position the display device 500 at a place upward from illuminated area, whereby there is no need of matching the center (B) of the display device 500 with the optical axis (A) of the illumination unit 200.

At this time, the illumination unit 200 may include a collimation lens 210 advancing in parallel the light emitted from the light source 100 to a predetermined direction, an integrator 220 uniformly emitting the light from the collimation lens to the display device 500, and a lens group 230 collecting the light emitted from the integrator 220 to the display device 500.

Preferably, the collimation lens 210 includes first and second collimation lenses 211, 212 to collect in parallel the light emitted from the light source 100 and inputs the collected light to be emitted into the integrator 220. The light emitted to the integrator 220 through the first and second collimation lenses 211, 212 is not a display device shape, such that the integrator 220 causes the light received via the first and second collimation lenses 211, 212 to be of a display device shape (e.g. square beam) and emitted to the display device 500 in a uniform light amount. Furthermore, the lens group 230 may include first and second illumination lenses 231, 232.

Figure 3A:
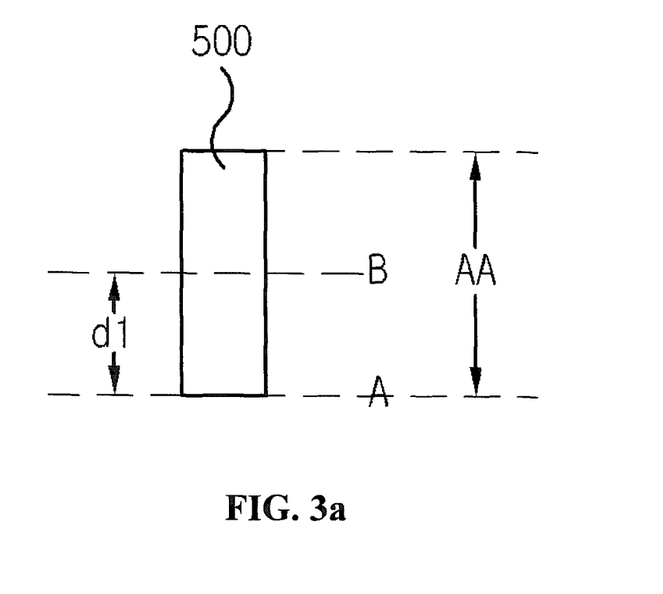
FIGS. 3a and 3b are schematic views illustrating a position of a display device responsive to upward illumination of a projector according to the present disclosure.
Figure 3B:
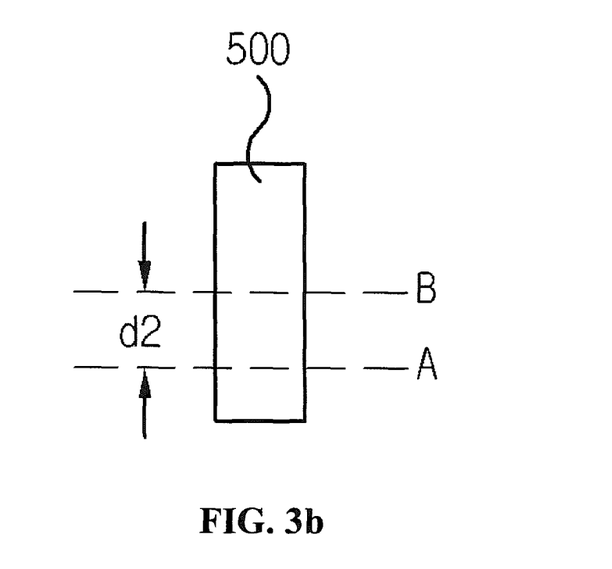

FIGS. 3a and 3b are schematic views illustrating a position of a display device responsive to upward illumination of a projector according to the present disclosure, where as noted, the position of the display device 500 is related to an optical axis of the illumination unit.

That is, the display device 500 is positioned opposite to the illumination unit, so that the display device 500 can exist on an optical axis different from that of the illumination unit. At this time, the display device 500 is preferably positioned 1%~200% offset from the optical axis (A). At this time, the meaning of offset may be defined in such a way that a distance (d1) from the optical axis (A) of the illumination unit to the center (B) of the display device 500 is equal to a half of an active area of the display device (500), where the display device 500 is positioned 100% offset from the optical axis (A) of the illumination unit.

Referring to FIG. 3b, if a distance (d2) from the optical axis (A) of the illumination unit to the center (B) of the display device 500 is less than a half the active area of the display device 500, the display device 500 is positioned less than 100% offset from the optical axis of the illumination unit. Although it is not shown in the figures, if a distance from the optical axis (A) of the illumination unit to the center (B) of the display device 500 is greater than a half the active area of the display device 500, the display device 500 is positioned greater than 100% offset from the optical axis of the illumination unit.

Figure 4:
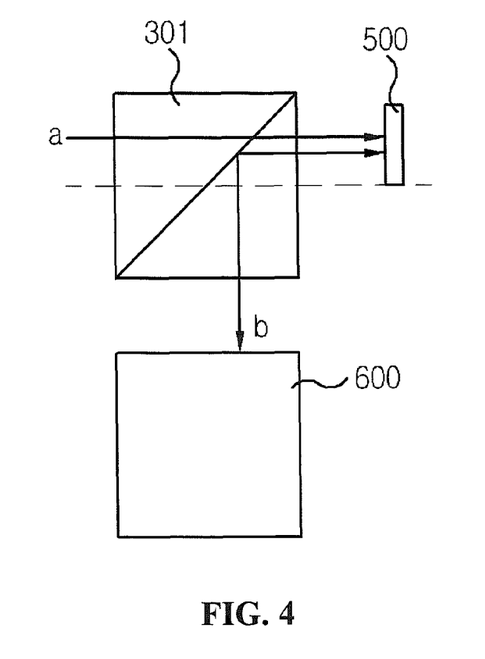
FIG. 4 is a schematic view illustrating a path of an advancing light when an optical element of a projector is used as a PBS (Polarizing Beam Splitter) according to the present disclosure.

FIG. 4 is a schematic view illustrating a path of an advancing light when an optical element of a projector is used as a PBS (Polarizing Beam Splitter) according to the present disclosure.

Light (a) from the illumination unit 200 transmits a PBS 301 to be incident into the display device 500. The display device 500 is configured in such a fashion that light that has enabled to realize an image by receiving the light (a) from the illumination unit 200 is reflected from the PBS 301 to be projected to a screen through a projecting unit 600.

Figure 5:
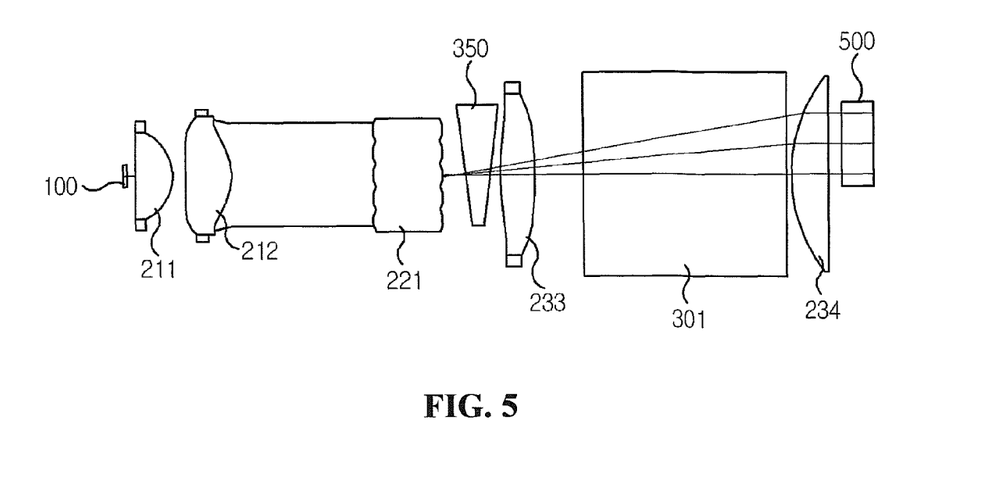
FIG. 5 is a schematic view illustrating a projector according to a first exemplary embodiment of the present disclosure.

FIG. 5 is a schematic view illustrating a projector according to a first exemplary embodiment of the present disclosure.

Methods of upward illumination from a projector may vary, and exemplary embodiments (described later) will describe configurations of projector for upward illumination.

A project according to a first exemplary embodiment constitutes an optical system by upwardly illuminating light to the display device by using a prism 350.

Therefore, the projector may include a light source 100, first and second collimation lenses 211, 212 advancing in parallel the light emitted from the light source to a predetermined direction, an FEL (Fly Eye Lens, 221) enabling to realize the light from the collimation lenses 211, 212 to be uniformly incident on the display device 500, and a prism 350 illuminating the display device 500 by upwardly polarizing the light through the FEL 221, where the FEL 221 may use an optical part capable of performing an equal function as that of the FEL.

In other words, the projector according to the first exemplary embodiment is configured such that the prism 350 is mounted inside the illumination unit where the light emitted from the light source 100 is upwardly polarized to be incident on the display device 500.

Figure 6A:
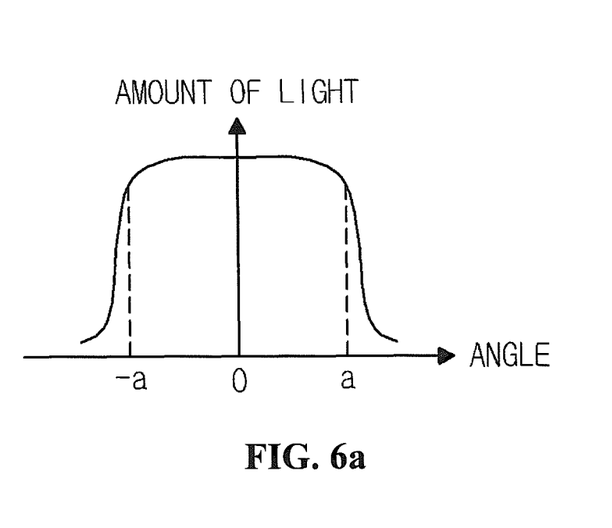
FIGS. 6a and 6b are an angle distribution view of a light before and after transmission through a prism of a project according to a first exemplary embodiment of the present disclosure.

That is, as shown in FIG. 6a, the light having passed the FEL 221 is made of a symmetrical shape in terms of left/right and up/down, such that symmetrical angles based on the optical axis are distributed.

Figure 6B:
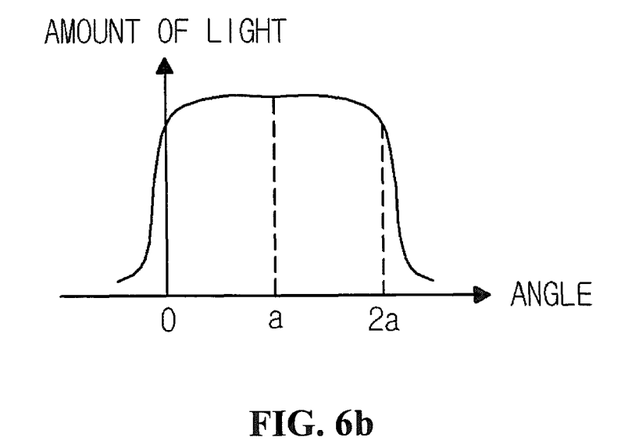

Referring to FIG. 6b, the light via the prism 350 is distributed with an upwardly moved angle based on the optical axis due to polarization effect of the prism 350. At this time, the upwardly moved angle of light is determined by an angle of the prism, where the angle of the prism is determined by degree of upward illumination. Furthermore, illumination lenses 233, 234 may be interposed between the prism 350 and the PBS 301, and between the PBS 301 and the display device 500.

Figure 7A:
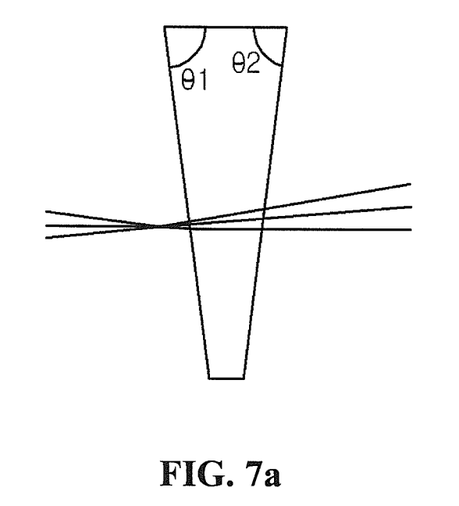
FIGS. 7a, 7b and 7c are schematic views illustrating a prism applied to a project according to a first exemplary embodiment of the present disclosure.
Figure 7B:
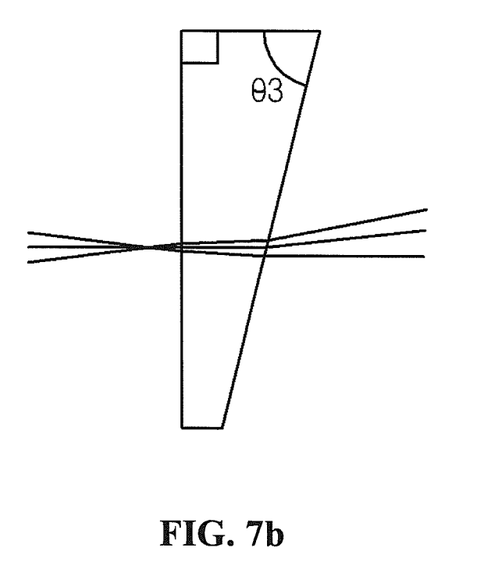
Figure 7C:
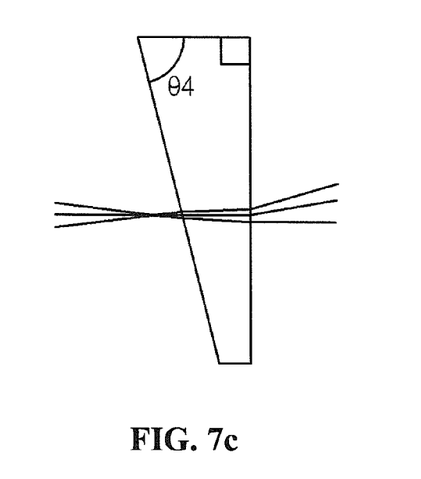

FIGS. 7a, 7b and 7c are schematic views illustrating a prism applied to a project according to a first exemplary embodiment of the present disclosure.

The prism may take the shape of a wedge, and may have one of structures of upwardly illuminating and refracting the incident light and emitted light as shown in FIG. 7a, of upwardly illuminating and refracting the emitted light as shown in FIG. 7b, and of upwardly illuminating and refracting the incident light as shown in FIG. 7c.

In order to upwardly illuminate and refract the incident light and emitted light as shown in FIG. 7a, an incident surface and an emitting surface of the prism are slanted at predetermined angles ($\theta 1, \theta 2$), in order to upwardly illuminate and refract the incident light as shown in FIG. 7b, an emitting surface of the prism is slanted at a predetermined angles (θ3), and in order to upwardly illuminate and refract the incident light as shown in FIG. 7b, an incident surface of the prism is slanted at a predetermined angles (θ4).

The prism of FIG. 7a has two sides that are not perpendicular to the optical axis of the illumination unit. To be more specific, the prism is formed with a first side and a second side that are not perpendicular to an optical axis of the FEL, a third side and a fourth side that are connected to the first and second sides, where the third and fourth sides are connected to the first side at an acute angle, and the third side and the fourth side are connected to the second side at an obtuse angle.

Figure 8:
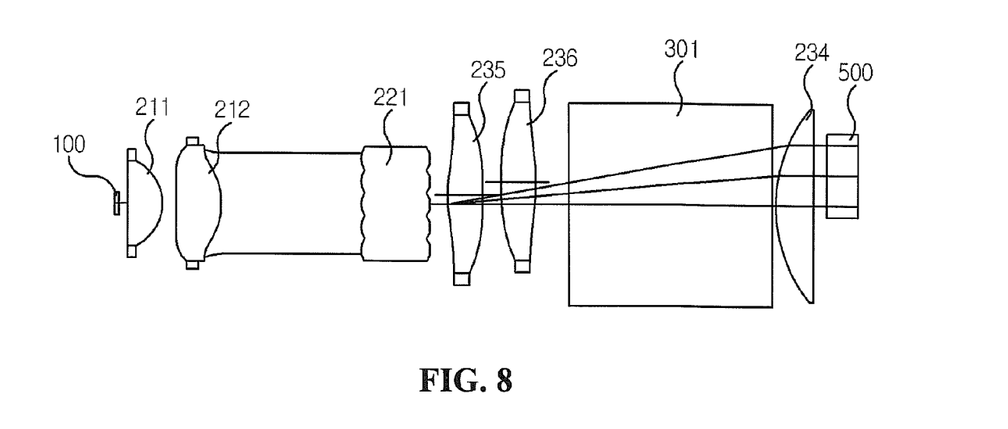
FIG. 8 is a schematic view illustrating a projector according to a second exemplary embodiment of the present disclosure.

FIG. 8 is a schematic view illustrating a projector according to a second exemplary embodiment of the present disclosure.

The projector according to the second exemplary embodiment of the present disclosure constitutes an optical system in which the prism moves on optical axes of two illumination lenses to allow the light to be upwardly illuminated onto the display device.

Therefore, the projector may include a light source 100, first and second collimation lenses 211, 212 advancing in parallel the light emitted from the light source to a predetermined direction, an FEL (Fly Eye Lens, 221) enabling to realize the light from the collimation lenses 211, 212 to be uniformly incident on the display device 500, and first and second illumination lenses 235, 236 each formed with an optical axis different from that of the FEL 221 for upwardly illuminating the light from the FEL 221 to the display device 500.

That is, the projector according to the second exemplary embodiment of the present disclosure is such that the optical axes of the first and second illumination lenses 235, 236 are moved in the different way from an optical axis of the FEL 221, whereby the light from the FEL 221 can be upwardly illuminated to the display device 500.

At this time, the optical axis of the first illumination lens 235 is upwardly positioned over the optical axis of the FEL 221, and the optical axis of the second illumination lens 236 is upwardly positioned over the first illumination lens 235, whereby the light from the FEL 221 is upwardly illuminated from the first illumination lens 235 and the light from the first illumination lens 235 is upwardly illuminated from the second illumination lens 236.

The present disclosure is such that two illumination lenses such as the first and second illumination lenses 235, 236 can be applied to the projector, or at least one illumination lens can be applied to the projector.

Figure 9:
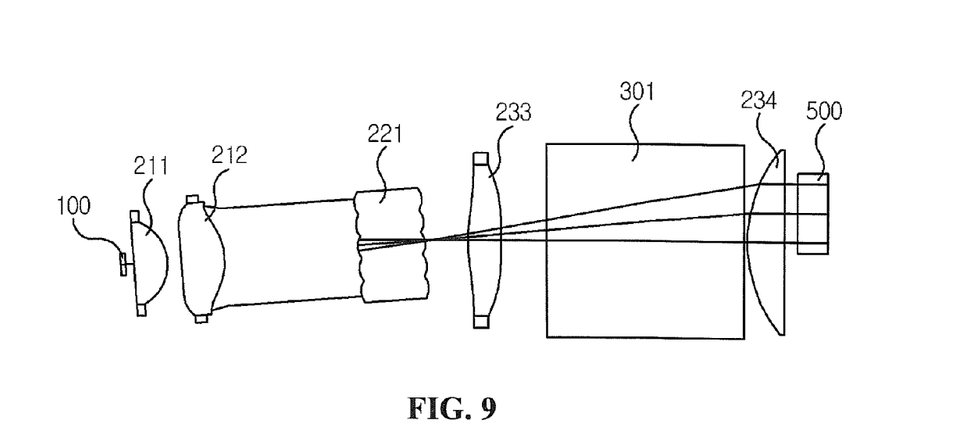
FIG. 9 is a schematic view illustrating a projector according to a third exemplary embodiment of the present disclosure.

FIG. 9 is a schematic view illustrating a projector according to a third exemplary embodiment of the present disclosure.

The third exemplary embodiment of the present disclosure is such that a light source 100 and first optical axes of collimation lenses 211, 212 and FEL 221 are tilted from a second optical axis of an illumination lens 233 to illuminate upwardly.

The projector is such that the light emitted from the light source 100 is made to advance to a first optical axis direction through the collimation lenses 211, 212 and the FEL 221, and advanced to a second optical axis of the tilted illumination lens 233 to be upwardly illuminated to display device 500.

The projectors according to the second and third exemplary embodiments can upwardly illuminate an illumination system using optical movement of tilting, dispensing with addition of new parts.

Meanwhile, an illumination unit of the third exemplary embodiment of the present disclosure, as compared with the configuration of projector in FIG. 1, may include a light source 100, first and second collimation lenses 211, 212 advancing in parallel the light emitted from the light source to a predetermined direction, an FEL (Fly Eye Lens, 221) enabling to realize the light from the collimation lenses 211, 212 to be uniformly incident on the display device 500, and an illumination lens 233 tilted from the light source 100 and optical axes of the collimation lenses 211, 212 and FEL 221. The illumination lens 233 may be interposed between the FEL 221 and the PBS 301. An illumination lens 234 may be interposed between the PBS 301 and the display device 500.

Figure 10:
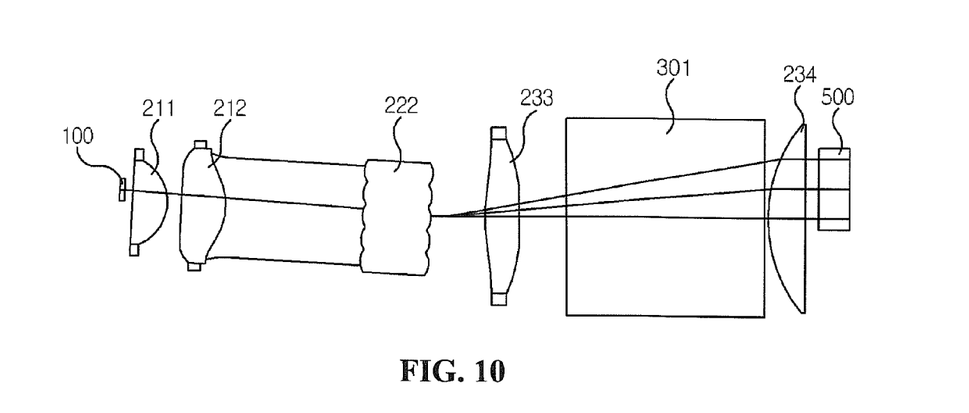
FIG. 10 is a schematic view illustrating a projector according to a fourth exemplary embodiment of the present disclosure.

FIG. 10 is a schematic view illustrating a projector according to a fourth exemplary embodiment of the present disclosure.

The projector according to a fourth exemplary embodiment of the present disclosure may include a light source 100, micro lenses in which optical axes of the collimation lenses 211, 212 are tilted from an optical axis of an FEL 222, the FEL 222 is formed at a light emitting surface and the incident light is collected at the light emitting surface, and micro lenses formed at the light emitting surface to upwardly advancing the collected light from an optical axis. Therefore, the light from the collimation lenses 211, 212 can be upwardly moved from the FEL 222 to be illuminated to the display device 500.

Figure 11:
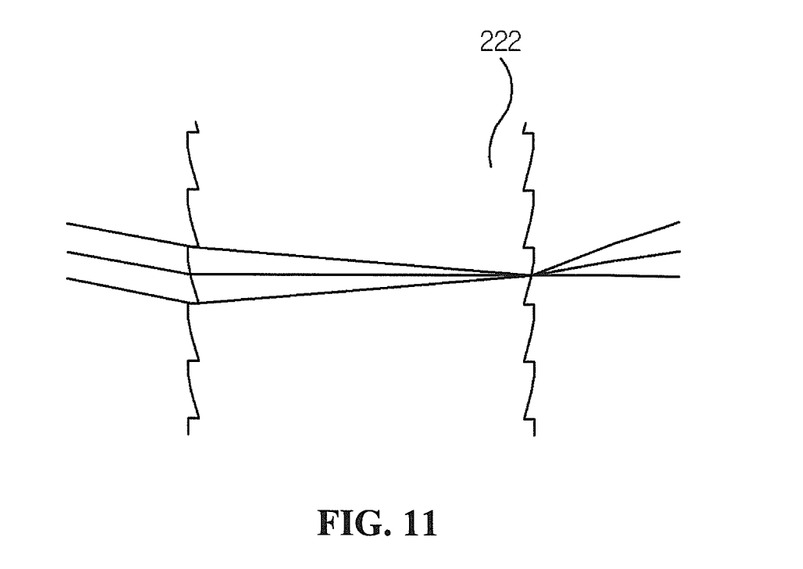
FIG. 11 is a partial cross-sectional view illustrating FEL according to the fourth exemplary embodiment of the present disclosure.

At this time, the light source 100 and the optical axes of the collimation lenses 211, 212 and FEL 222 may be on the same line. Furthermore, a light incident surface and a light emitting surface of the FEL 222, as shown in FIG. 11, take the shapes of saw-teeth, such that cross-sections of the light incident surface and the light emitting surface respectively take the shapes of saw-teeth by individual cross-sections of the micro lenses.

Figure 12A:
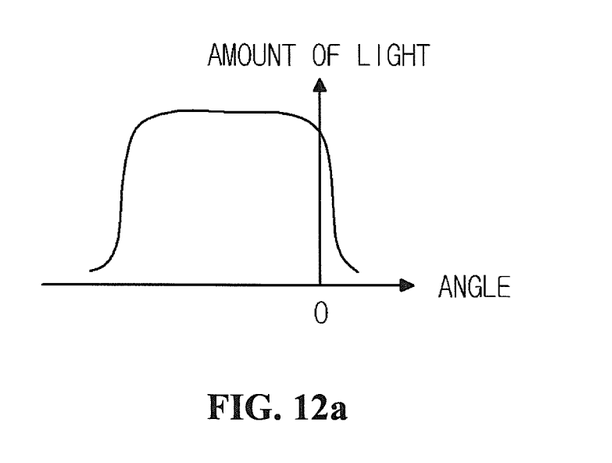
FIGS. 12a and 12b are an angle distribution view of a light before and after transmission through a prism of a project according to the fourth exemplary embodiment of the present disclosure.
Figure 12B:
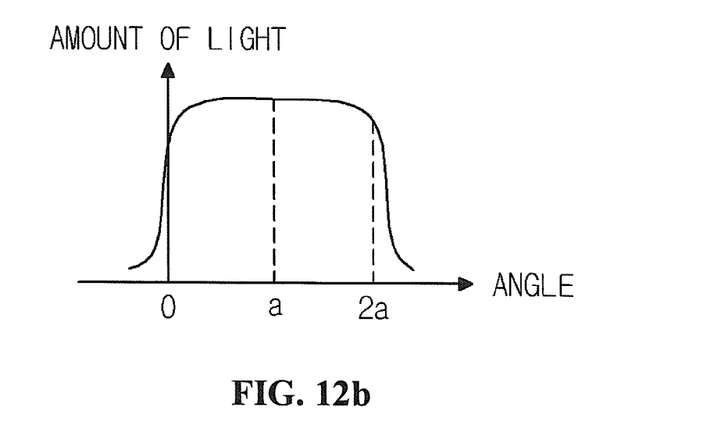
Figure 13:
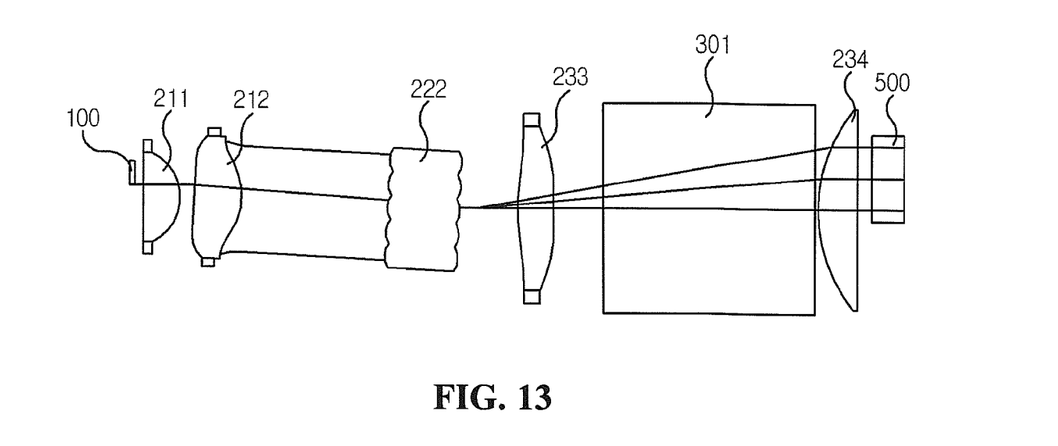
FIG. 13 is a schematic view illustrating another example of a projector according to the fourth exemplary embodiment of the present disclosure.

Referring to FIG. 12a, an angle distribution of light prior to incidence on the FEL 222 is distributed to the left relative to the optical axis of the FEL 222 due to the light source 100 and the optical axes of the collimation lenses 211, 212 being tilted. But, an angle of light having passed the FEL 222 is distributed to the right due to upward direction relative to the optical axis, as shown in FIG. 12b. Furthermore, as illustrated in FIG. 13, in a case the center of the light source 100 is upwardly positioned from the optical axes of the collimation lenses 211, 212, the light can be upwardly illuminated to the display device 500.

Figure 14:
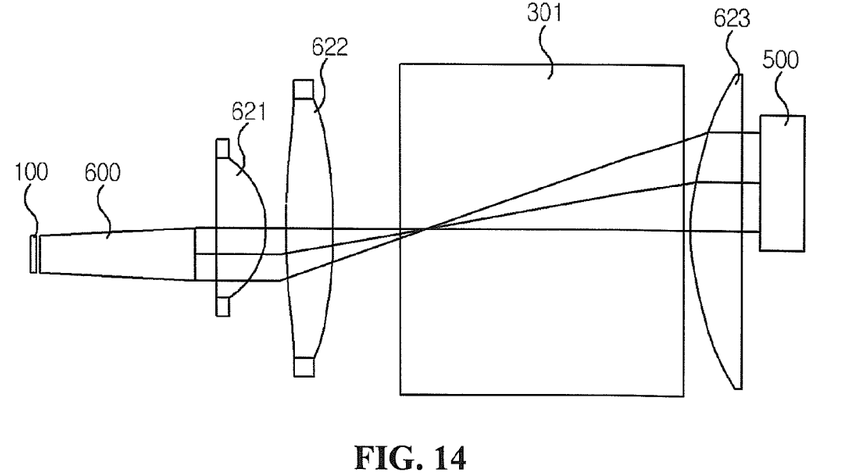
FIG. 14 is a schematic view illustrating a projector according to a fifth exemplary embodiment of the present disclosure.
Figure 15:
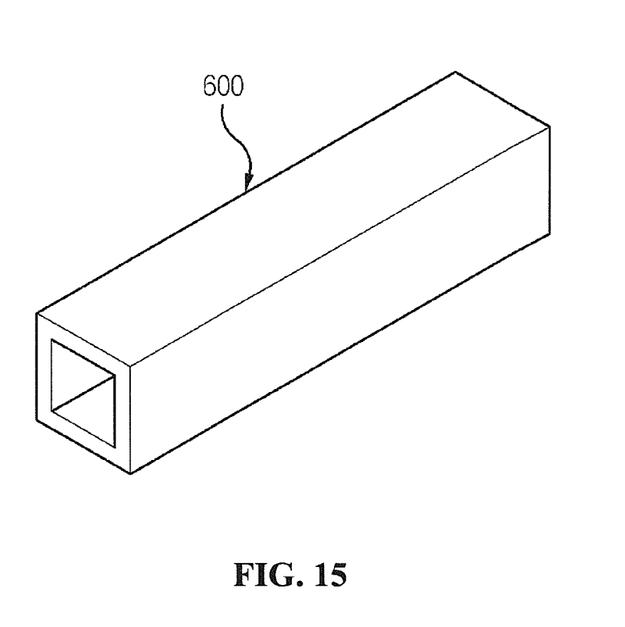
FIG. 15 is a schematic block diagram illustrating an optical guide block according to the fifth exemplary embodiment of the present disclosure.

FIG. 14 is a schematic view illustrating a projector according to a fifth exemplary embodiment of the present disclosure.

The projector according to the fifth exemplary embodiment of the present disclosure is such that light is upwardly illuminated to the display device 500 using a light guide block 600. The light guide block 600 may be interposed between a light source 100 and illumination lenses 621, 622, and an optical axis of the light guide block 600 and optical axes of the illumination lenses 621, 622 may be arranged off-sided.

At this time, light emitted from the light source 100 is incident on an inlet of the light guide block 600, and the light emitted from an outlet of the light guide block 600 is upwardly illuminated to the display device 500 through the illumination lenses 621, 622 and the PBS 301. The illumination lenses 621, 622 collect the light emitted through the outlet of the light guide block 600 to the PBS 301. The light guide block 600 may be manufactured in a square barrel shape formed with a square through hole, manufactured with four (4) pieces of mirror put together, glass or with transparent body.

In a case the light guide block 600 is manufactured with glass or transparent body, the light is all reflected from inside and guided using a difference of refractive index between the light guide block and air, where the refractive index of light guide block is greater than the air. Furthermore, the light guide block 600 can make a same square beam as that of an active area of the display device 500.

Figure 16:
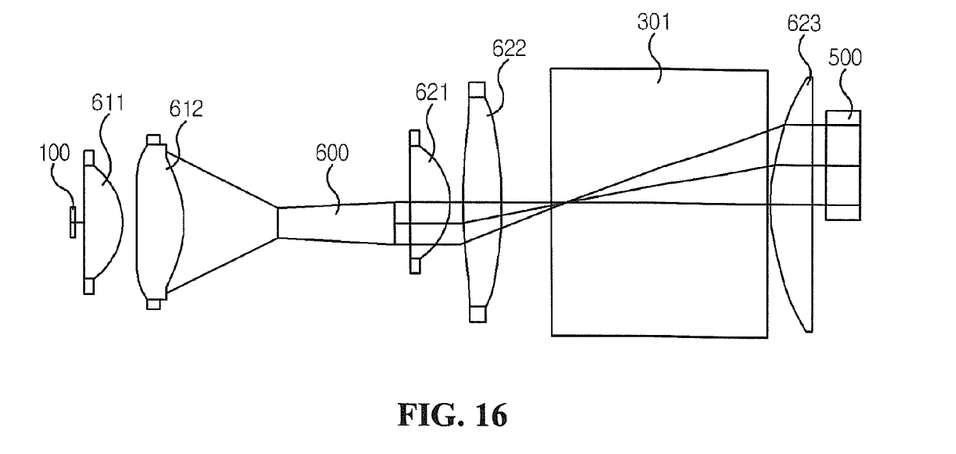
FIG. 16 is a schematic diagram illustrating a deformed example of a projector according to a second exemplary embodiment of the present disclosure.

FIG. 16 is a schematic diagram illustrating a deformed example of a projector according to a second exemplary embodiment of the present disclosure.

Referring to FIG. 16, the third exemplary embodiment of the present disclosure, as a modified example from the second exemplary embodiment, may be configured in such a way that first light collecting lenses 611, 612 collecting light emitted from a light source 100, and a light guide block 600 generating a same shape of light as that of the display device 500 by receiving the light collected from the first and second light collecting lenses 611, 612, are interposed between the light source 100, and optical axes of the illumination lenses 621, 622, and an optical axis of the light guide block 600 are arranged offside.

This type of projector is also such that the light emitted from the light source 100 can be collected at the first and second light collecting lenses 611, 612, and the light guided from the light guide block 600 can be upwardly illuminated to the display device 500 from the illumination lenses 621, 622 via the PBS 301. An illumination lens 623 may be interposed between the PBS 301 and the display device 500.

The above-mentioned projector according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A projector, the projector comprising: a light source; an illumination unit illuminating light incident from the light source; and a display device enabling to realize an image by receiving the light irradiated from the illumination unit, and whose center is positioned at an axis different from an optical axis of the illumination unit;
   wherein the illumination unit includes a collimation lens advancing in parallel the light emitted from the light source to a predetermined direction, an optical part equally emitting the light from the collimation lens in the display device, and at least one illumination lens that is tilted from the optical axis of the light source, the collimation lens, and the optical part.

2. The projector of claim 1, wherein the display device is positioned at an upward direction of the optical axis of the illumination unit.

3. The projector of claim 2, wherein an offset of the display device is positioned at 1~200%.

4. The projector of claim 1, wherein the display device is a reflective display device or a transmissive display device.

5. The projector of claim 1, further including a PBS (Polarizing Beam Splitter) that transmits the light from the illumination unit to the display device.

6. The projector of claim 1, further including a PBS transmitting the light from the illumination unit to the display device, wherein the illumination lens includes first and second illumination lenses, where the first illumination lens is interposed between the optical part and the PBS, and the second illumination lens is interposed between the PBS and the display device.

7. The projector of claim 1, wherein the illumination unit includes an FEL (Fly Eye Lens), where the FEL includes micro lenses formed at an incidence surface for collecting the incident light on a light emitting surface, and micro lenses formed at a light emitting surface for advancing the collected light upwards from the optical axis.

8. A projector comprising:
   a light source;
   an illumination unit illuminating light incident from the light source; and
   a display device enabling to realize an image by receiving the light irradiated from the illumination unit, and whose center is positioned at an axis different from an optical axis of the illumination unit;
   wherein the illumination unit includes an FEL (Fly Eye Lens), where the FEL includes micro lenses formed at an incidence surface for collecting the incident light on a light emitting surface, and micro lenses formed at a light emitting surface for advancing the collected light upwards from the optical axis; and
   wherein the illumination unit further includes a collimation lens advancing in parallel in a predetermined direction the light emitted from the light source to the FEL, and the optical axis of the collimation lens and the light source is tilted from the optical axis of the FEL.

9. A projector comprising:
   a light source;
   an illumination unit illuminating light incident from the light source; and
   a display device enabling to realize an image by receiving the light irradiated from the illumination unit, and whose center is positioned at an axis different from an optical axis of the illumination unit;
   wherein the illumination unit includes an FEL (Fly Eye Lens), where the FEL includes micro lenses formed at an incidence surface for collecting the incident light on a light emitting surface, and micro lenses formed at a light emitting surface for advancing the collected light upwards from the optical axis; and
   wherein the illumination unit further includes a collimation lens advancing in parallel to in a predetermined direction the light emitted from the light source to the FEL, and a center of the light source is upwardly positioned from the optical axis of the collimation lens.

10. A projector comprising:
    a light source;
    an illumination unit illuminating light incident from the light source; and
    a display device enabling to realize an image by receiving the light irradiated from the illumination unit, and whose center is positioned at an axis different from an optical axis of the illumination unit;
    wherein the illumination unit further collimation lenses advancing in parallel to in a predetermined direction the light emitted from the light source, an FEL (Fly Eye Lens) equally emitting the light of the collimation lenses to the display device, and a prism upwardly eccentrically emitting the light through the FEL to illuminate the display device.

11. The projector of claim 10, wherein the prism is one of a structure of refracting the incident light and the emitted light to upwardly illuminate the display device, a structure of refracting the emitted light to upwardly illuminate the display device, and a structure of refracting the incident light to upwardly illuminate the display device.

12. The projector of claim 10, wherein the prism is a projector formed with two sides that are not perpendicular to the optical axis of the illuminating unit.

13. The projector of claim 1, wherein the illumination unit includes collimation lenses advancing in parallel in a predetermined direction the light emitted from the light source, an FEL (Fly Eye Lens) equally emitting the light of the collimation lenses to the display device, and first and second lenses each having an optical axis different from that of the FEL, and upwardly illuminating the light through the FEL to the display device.

14. A projector comprising:
a light source;
an illumination unit illuminating light incident from the light source; and
a display device enabling to realize an image by receiving the light irradiated from the illumination unit, and whose center is positioned at an axis different from an optical axis of the illumination unit;
wherein the illumination unit includes an optical guide block receiving the light emitted from the light source to generate an optical shape that is same as that the display device and formed a barrel shape having a through hole, and illumination lenses formed with an optical axis deviated from that of optical guide block.

15. The projector of claim 14, wherein first and second condenser lenses condensing the light emitted from the light source to the optical guide block are interposed between the light source and the optical guide block.

16. The projector of claim 10, wherein the prism upwardly and eccentrically illuminating the light through the FEL is formed with a first side and a second side that are parallel to an optical axis of the FEL, a third side and a fourth side that are connected to the first and second sides, where the third and fourth sides are connected to the first side at an acute angle, respectively, and the third side and the fourth side are connected to the second side at an obtuse angle, respectively.

* * * * *